(12) United States Patent
Yuan

(10) Patent No.: US 11,386,933 B2
(45) Date of Patent: Jul. 12, 2022

(54) IMAGE INFORMATION PROCESSING METHOD AND APPARATUS, AND STORAGE MEDIUM

(71) Applicant: TENCENT TECHNOLOGY (SHENZHEN) COMPANY LIMITED, Shenzhen (CN)

(72) Inventor: Jiaping Yuan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/191,678

(22) Filed: Mar. 3, 2021

(65) Prior Publication Data
US 2021/0193184 A1    Jun. 24, 2021

Related U.S. Application Data

(63) Continuation of application No. PCT/CN2019/118344, filed on Nov. 14, 2019.

(30) Foreign Application Priority Data

Dec. 7, 2018 (CN) .......................... 201811494173.8

(51) Int. Cl.
   *G11B 27/036* (2006.01)
   *G06F 40/205* (2020.01)
   (Continued)

(52) U.S. Cl.
   CPC .......... *G11B 27/036* (2013.01); *G06F 40/205* (2020.01); *G06T 11/60* (2013.01); *G06V 40/168* (2022.01)

(58) Field of Classification Search
   CPC . G11B 27/036; G06F 40/205; G06K 9/00268; G06T 11/60
   See application file for complete search history.

(56) References Cited

U.S. PATENT DOCUMENTS

2012/0005595 A1    1/2012  Gavade et al.
2014/0362159 A1*  12/2014  Zhai .................. H04N 7/141
                                                     348/14.01
(Continued)

FOREIGN PATENT DOCUMENTS

CN    104751410 A    7/2015
CN    105118082 A   12/2015
(Continued)

OTHER PUBLICATIONS

The World Intellectual Property Organization (WIPO) International Search Report for PCT/CN2019/118344 dated Feb. 18, 2020 6 Pages (including translation).
(Continued)

*Primary Examiner* — Mishawn N. Hunter
(74) *Attorney, Agent, or Firm* — Anova Law Group, PLLC

(57) ABSTRACT

An image information processing method is provided. The method includes obtaining a to-be-processed image, and preprocessing the to-be-processed image to obtain target image information, extracting facial feature point information from the target image information, and integrating the facial feature point information to a target region image to obtain an integrated image, the target region image being part of a playback image in a preset playback interval of a video, and displaying the integrated image on the video in response to detecting that the video is played to the preset playback interval.

19 Claims, 6 Drawing Sheets

(51) Int. Cl.
*G06T 11/60* (2006.01)
*G06V 40/16* (2022.01)

(56) References Cited

U.S. PATENT DOCUMENTS

2018/0070022 A1  3/2018 He
2018/0276515 A1* 9/2018 Huang ............ G06K 19/06037

FOREIGN PATENT DOCUMENTS

| CN | 105335925 A | 2/2016 |
|---|---|---|
| CN | 105513098 A | 4/2016 |
| CN | 106599817 A | 4/2017 |
| CN | 107750007 A | 3/2018 |
| CN | 108040290 A | 5/2018 |
| CN | 109670427 A | 4/2019 |

OTHER PUBLICATIONS

The State Intellectual Property Office of the People's Republic of China (SIPO) Office Action 1 for 201811494173.8 dated May 11, 2020 19 Pages (including translation).

Jiaqi Wang, "Research on Barrage Culture Based on Barrage Video Website," China Master's Theses Full-text Database, Information Technology, Sep. 30, 2015 (Sep. 30, 2015) 81 pages.

* cited by examiner

IMAGE INFORMATION PROCESSING METHOD AND APPARATUS, AND STORAGE MEDIUM

RELATED APPLICATIONS

This application is a continuation application of PCT Patent Application No. PCT/CN2019/118344, filed on Nov. 14, 2019, which claims priority to Chinese Patent Application No. 201811494173.8, entitled "IMAGE INFORMATION PROCESSING METHOD AND APPARATUS, AND STORAGE MEDIUM" and filed on Dec. 7, 2018, all of which are incorporated herein by reference in entirety.

FIELD OF THE TECHNOLOGY

The present disclosure relates to the field of communications technologies, and specifically, to an image information processing method and apparatus, and a storage medium.

BACKGROUND

With the constant popularization and development of terminals, users are increasingly relying on the terminals, and various applications may be installed on the terminals. Image processing applications are popular among users, and the users may make interest adjustments on specified features in an image by using the image processing applications, such as manually adding special effects to specified facial features in the image to achieve interesting processing.

In the related technology, a terminal displays a plurality of effect controls on an image in an image processing application. A user may select special effects by clicking corresponding effect controls, and the terminal adds the special effects selected by the user to the image, such as adding a cat whisker effect to facial features to achieve interesting processing.

SUMMARY

Embodiments of the present disclosure provide an image information processing method and apparatus, and a storage medium.

One aspect of the present disclosure provides an image information processing method. The method includes obtaining a to-be-processed image, and preprocessing the to-be-processed image to obtain target image information, extracting facial feature point information from the target image information, and integrating the facial feature point information to a target region image to obtain an integrated image, the target region image being part of a playback image in a preset playback interval of a video, and displaying the integrated image on the video in response to detecting that the video is played to the preset playback interval.

Another aspect of the present disclosure provides an image information processing apparatus. The image information processing apparatus includes a memory storing computer program instructions, and a processor coupled to the memory and configured to executing the computer program instructions and perform obtaining a to-be-processed image, and preprocessing the to-be-processed image to obtain target image information, extracting facial feature point information from the target image information, and integrating the facial feature point information to a target region image to obtain an integrated image, the target region image being part of a playback image in a preset playback interval of a video, and displaying the integrated image on the video in response to detecting that the video is played to the preset playback interval.

Yet another aspect of the present disclosure provides a non-transitory computer-readable storage medium. The non-transitory computer-readable storage medium stores computer program instructions executable by at least one processor to perform obtaining a to-be-processed image, and preprocessing the to-be-processed image to obtain target image information, extracting facial feature point information from the target image information, and integrating the facial feature point information to a target region image to obtain an integrated image, the target region image being part of a playback image in a preset playback interval of a video, and displaying the integrated image on the video in response to detecting that the video is played to the preset playback interval.

Other aspects of the present disclosure can be understood by those skilled in the art in light of the description, the claims, and the drawings of the present disclosure.

BRIEF DESCRIPTION OF THE DRAWINGS

To more clearly describe technical solutions of certain embodiments of the present disclosure, accompanying drawings are described below. The accompanying drawings are illustrative of embodiments of the present disclosure, and a person of ordinary skill in the art may still derive other drawings from these accompanying drawings without having to exert creative efforts. The accompanying drawings are not necessarily drawn to scale.

DETAILED DESCRIPTION

To make objectives, technical solutions, and advantages of the present disclosure clearer and more comprehensible, certain embodiments of the present disclosure are further elaborated in detail with reference to the accompanying drawings. The described embodiments are not to be construed as a limitation to embodiments of the present disclosure. All other embodiments obtained by a person of ordinary skill in the art without creative efforts shall fall within the protection scope of embodiments of the present disclosure.

According to one or more embodiments of the present disclosure, a technical realization is made in that certain existing effect processing when performed on facial features of a static to-be-processed image may result in relatively poor processing flexibility and limitation, and may bring undiversified visual experience and a relatively poor sense of immersion to users. Certain embodiments of the present disclosure provide an image information processing method and apparatus, and a storage medium believed to elicit relatively improved facial feature effect processing.

Figure 1:
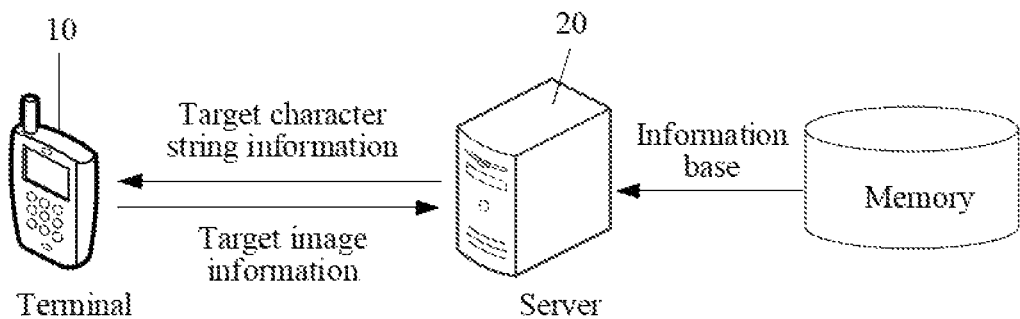
FIG. 1 is a schematic diagram of a scenario of an image information processing system according to one or more embodiments of the present disclosure.

FIG. 1 is a schematic diagram of a scenario of an image information processing system according to one or more embodiments of the present disclosure, including a terminal 10 and a server 20. The terminal 10 and the server 20 may be connected through a communications network. The communications network includes a wired network and a wireless network. The wireless network includes one or a combination of a wireless wide area network, a wireless local area network, a wireless metropolitan area network, or a wireless personal network. The network includes network entities such as a router and a gateway, which are not shown in the figure. The terminal 10 may exchange information with the server 20 through the communications network, for example, may download an application (such as an image processing application) from the server 20, and interact with the server 20 during use of the application.

The image information processing system may include an image information processing apparatus. The image information processing apparatus may be specifically integrated into a terminal, such as a tablet computer, a mobile phone, a notebook computer, or a tablet computer that has a storage unit and has a computing capability due to an installed microprocessor. In FIG. 1, the terminal is the terminal 10 in FIG. 1. Various programs desirable from a user, for example, an image processing program with image processing, may be installed in the terminal 10. The terminal 10 may be configured to: obtain a to-be-processed image, preprocess the to-be-processed image to obtain target image information, transmit the target image information to the server 20, and receive target character string information fed back by the server 20 after face fusion processing is performed according to the target image information. The character string information is reversible character string information formed after the image information is encoded and compressed in a case that the image information meets a certain requirement of fidelity. The reversible character string information may be used for reducing a data size of the image information, to facilitate storage and transmission of the image information. The terminal 10 parses the target character string information, to obtain an integrated image after the face fusion processing, and overlays and displays the integrated image on the video when detecting that the video is played to a corresponding preset playback interval.

The image information processing system may further include the server 20, which is configured to: receive the target image information transmitted by the terminal 10, perform face fusion processing according to the target image information, to obtain target character string information corresponding to the integrated image after face fusion of the target image information and the target region image, and transmit the target character string information to the terminal 10.

The image information processing system may further include a memory, configured to store an information base. The information base includes an image processing application installation package, video data, a target region image, and the like, so that the server may obtain the target region image and the target image information from the memory to perform face fusion processing, generate the target character string information, and transmit the target character string information to the terminal 10.

The schematic diagram of the scenario of the image information processing system shown in FIG. 1 is merely an example. The image information processing system and the scenario described in this embodiment of the present disclosure are intended to more clearly describe the technical solutions of the embodiments of the present disclosure, and do not constitute a limitation to the technical solutions provided in the embodiments of the present disclosure. Along with evolution of the image information processing system and emergence of a new service scenario, the technical solutions provided in the embodiments of the present disclosure is also applicable to similar technical problems.

Detailed descriptions are separately provided below.

In this embodiment, descriptions are made from the perspective of an image information processing apparatus. The image information processing apparatus may be specifically integrated into a terminal, such as a tablet computer or a mobile phone that has a storage unit and has a computing capability due to an installed microprocessor.

An image information processing method is provided, including: obtaining a to-be-processed image, and preprocessing the to-be-processed image to obtain target image information; extracting facial feature point information from the target image information, and integrating the facial feature point information to a target region image, to obtain an integrated image; and overlaying and displaying the integrated image on a video in response to detecting that the video is played to a corresponding preset playback interval.

Figure 2:
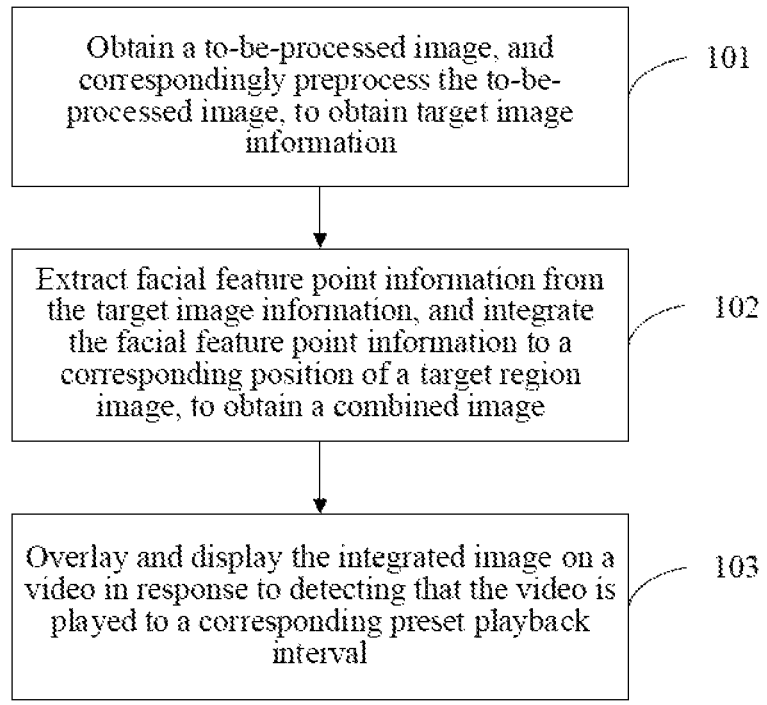
FIG. 2 is a schematic flowchart of an image information processing method according to one or more embodiments of the present disclosure.
Figure 3:
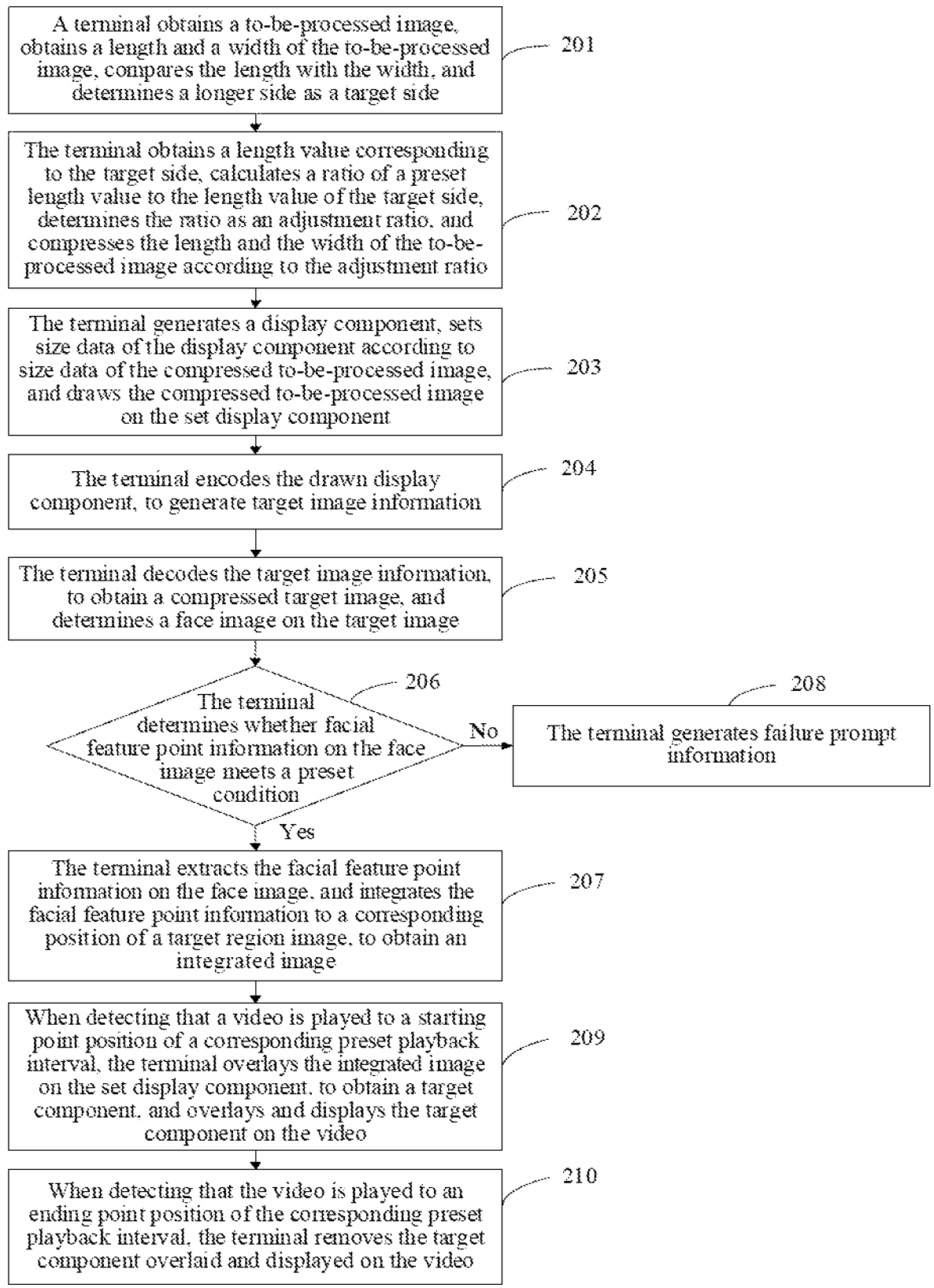
FIG. 3 is another schematic flowchart of an image information processing method according to one or more embodiments of the present disclosure.

The term "to-be-processed image" may also be understood as an "image." In certain embodiments, the term "to-be-processed image" refers to an image that is subject to one or more steps referenced in the method according to embodiments illustratively shown at FIG. 1, FIG. 2, and/or FIG. 3.

When applicable, the term "preprocessing" or "preprocessed" may also be understood as "processing" or "processed," respectively. Likewise, the term "postprocessing" or "postprocessed" may also be understood as "processing" or "processed," respectively. In certain embodiments, however, the term "preprocessing" refers to a process step occurring prior to one or more other process steps and the term "postprocessing" refers to a process step occurring after one or more other process steps.

FIG. 2 is a schematic flowchart of an image information processing method according to one or more embodiments of the present disclosure. The image information processing method may be applicable to the foregoing computing device which may be a computer. The image information processing method includes the following steps:

Step 101. Obtain a to-be-processed image, and preprocess the to-be-processed image to obtain target image information.

The to-be-processed image may be a picture acquired by using a camera and particularly in real time by using a camera, or a picture cached or stored on the terminal, or the like. A format of the image may be a format such as a bitmap (BMP), a Joint Photographic Experts Group (JPEG), or a Graphics Interchange Format (GIF).

The to-be-processed image may be obtained by using the following operations: A user opens an application client such as an image processing application client (hereinafter also referred to as an image processing client or a client for short) on the terminal. The image processing client displays a main interface, and the displayed main interface may present a plurality of video display controls. When the user clicks on a target video display control on the main interface, the client enters a poster display interface corresponding to the target video display control. The poster display interface may include an image selection control, and the image selection control is configured to trigger a quick entry of obtaining the to-be-processed image. After detecting that the user clicks on the image selection control, the image processing client may invoke a camera assembly to acquire the to-be-processed image. Optionally, the image processing client may alternatively invoke an album on the terminal, and further select a certain target picture in the album as the to-be-processed image.

Further, after the to-be-processed image is obtained, the to-be-processed image may be preprocessed. The preprocessing may include performing noise reduction processing, pixel adjustment processing, data size adjustment processing, or the like on the image, to obtain the target image information. The target image information after the preprocessing may be directly subject to subsequent feature extraction.

In some implementations, the step of obtaining a to-be-processed image and preprocessing the to-be-processed image to obtain target image information may include compressing a size and a data size of the to-be-processed image to obtain the target image information.

With the development of a camera and screen display pixels of the terminal, a pixel size and a data size of an image are also correspondingly and increasingly large. To more accurately and quickly process the image subsequently, a pixel size and the data size of the to-be-processed image are correspondingly limited. For example, the to-be-processed image is limited to 500 kilobytes (KB) and 1080 pixels. Pixels refer to small blocks that form the image. Each of the small blocks has a clear position and assigned color values, and the colors and positions of the small blocks determine the appearance of the image. The pixels may be regarded as an indivisible unit or element in an entire image. Indivisibility means that the pixels cannot be recut into a smaller unit or element, and exist as a small block with a single color. Each bitmap includes a certain quantity of pixels. The pixels determine a size of the image presented on a screen. That is, the quantity of pixels of the image determines the size of the image.

Therefore, and in certain embodiments, the size and the data size of the to-be-processed image need to be compressed, so that the to-be-processed image is of the data size of 500 KB and the size of 1080 pixels, and the compressed image information that meets the condition is determined as the target image information.

In some implementations, the step of compressing a size and a data size of the to-be-processed image, to obtain the target image information may include: compressing the size of the to-be-processed image; generating a display component, setting a size of the display component according to a size of the compressed to-be-processed image, and drawing the compressed to-be-processed image on the set display component; and encoding the drawn display component, to generate the target image information.

When a resolution of the picture is determined, the pixels of the image and a length of the image may have a fixed relationship. For example, a resolution of each picture is generally 72 dots per inch (DPI). That is, each inch includes 72 pixels. In this case, one centimeter is equal to 28 pixels. Therefore, the size of the to-be-processed image may be compressed according to a ratio relationship between pixels of the to-be-processed image and limited pixels.

Further, to compress the data size of the to-be-processed image, a display component may need to be generated. The display component may be a Canvas component, and belongs to an element for drawing an image in the fifth major revision (HTML5) that applies Hypertext Markup Language (HTML) under a standard generalized markup language. The Canvas component allows to dynamically render a bitmap image. The Canvas component may be commonly understood as a Canvas canvas. The Canvas canvas has a height attribute and a width attribute. The height attribute is a height of the Canvas canvas. Like an image, this attribute may be specified as an integer pixel value or a percentage of a window height. When this value changes, any drawing that has been completed on the canvas is erased. A default value of the height attribute is 150. The width attribute is a width of the canvas. Like an image, this attribute may be specified as an integer pixel value or a percentage of a window width. When this value changes, any drawing that has been completed on the canvas is erased. A default value of the width attribute is 300. The height attribute and the width attribute of the Canvas canvas may be set according to a size of the compressed to-be-processed image. The height attribute and the width attribute of the Canvas canvas may be equal to the size of the compressed to-be-processed image, and the compressed to-be-processed image is drawn on the Canvas canvas.

After the compressed to-be-processed image is drawn on the Canvas canvas, the image quality of the compressed to-be-processed image may be changed by using a toDataURL method of the Canvas canvas, and the compressed to-be-processed image is compressed into character string information, to further change the data size of the compressed to-be-processed image, so that the compressed to-be-processed image meets a limitation requirement of the data size. The character string information is reversible. That is, the character string information may be decoded, to obtain a compressed to-be-processed image. The character string information that meets the pixel size (that is, the size) and the data size is determined as the target image information.

In some implementations, the step of compressing the size of the to-be-processed image may include: obtaining a length and a width of the to-be-processed image; comparing the length with the width, and determining a longer side as a target side; and compressing the size of the to-be-processed image according to a length value of the target side.

The pixels of the image and the length of the image may have a fixed relationship. Therefore, an equivalent effect of adjusting the length is achieved according to the adjustment of the pixels. That is, a length pixel (that is, the length) and a width pixel (that is, the width) of the to-be-processed image may be obtained. The length pixel is a pixel value of the length of the to-be-processed image, and the width pixel is a pixel value of the width of the to-be-processed image. To limit the pixels of the to-be-processed image, only an adjustment of a pixel of a larger-pixel side in the length pixel and the width pixel may need to be limited, and a pixel of a smaller-pixel side definitely also meets the limitation condition. Therefore, the length pixel may be compared with the width pixel, the side with the larger pixel is determined as the target side, a ratio relationship between the pixel value of the target side and the limited pixels is obtained, and the size of the to-be-processed image is compressed according to the ratio relationship.

In some implementations, the step of compressing the size of the to-be-processed image according to a length value of the target side may include: obtaining the length value corresponding to the target side; calculating a ratio of a preset length value to the length value of the target side, and determining the ratio as an adjustment ratio; and compressing the length and the width of the to-be-processed image according to the adjustment ratio.

The pixels of the image and the length of the image may have a fixed relationship. Therefore, an equivalent effect of adjusting the length is achieved according to the adjustment of the pixels. That is, a pixel (that is, the length value) corresponding to the target side with a larger pixel value (that is, a larger length value) may be obtained. The preset length value (that is, a preset pixel) may be 540 pixels or 1080 pixels. A ratio of the preset pixel to the pixel of the target side is calculated, and the ratio is determined as the adjustment ratio. Because the pixels and the length have a fixed relationship, the length and the width of the to-be-processed image may be compressed according to the adjustment ratio, and pixels of the compressed to-be-processed image meet the requirement of limited pixels.

Step 102. Extract facial feature point information from the target image information, and integrate the facial feature point information to a target region image, to obtain an integrated image.

Because the target image information includes the reversible character string information, the character string information may be decoded to obtain a target image whose size (that is, the pixel size) and data size both meet the limiting condition, and a face image may be quickly determined from the target image information. Because pattern features, for example, a histogram feature, a color feature, a template feature, a structural feature, and a Haar-like feature (the Haar-like feature is a feature that reflects grayscale changes of an image, and a pixel submodule calculates a difference), included in the face image are very rich, feature scanning may be performed on the target image, to quickly determine the face image.

Further, some target images may include a plurality of face images. Therefore, when the plurality of face images are detected, a face image close to a center of the image may be determined as the target face image, image preprocessing is performed on the target face image, and facial feature point information on the target face image is further extracted. The facial feature point information may include geometric descriptions of local composition points such as eyes, a nose, a mouth, and a chin. The target region image belongs to a playback image in a corresponding preset playback interval of the video. For example, the target region image may be an image of a specified image in a playback image in the corresponding preset playback interval in the video. Face-level fusion is performed on the extracted facial feature point information and the specified image in the target region image, to obtain an integrated image. The integrated image not only has facial features of the to-be-processed image, but also presents appearance features of the specified image in the corresponding preset playback interval of the video, thereby implementing the function of seamlessly changing the face.

In some implementations, the step of extracting facial feature point information from the target image information, and integrating the facial feature point information to a target region image, to obtain an integrated image may include: decoding the target image information, to obtain a target image; determining a face image on the target image; and extracting facial feature point information on the face image, and integrating the facial feature point information to the corresponding position of the target region image, to obtain the integrated image.

The image information is the reversible character string information. Therefore, the target image information may be decoded, to obtain the target image whose size and data size both meet the limiting condition, face feature scanning is performed on the target image, to quickly determine the face image, processing such as grayscale correction or noise filtering is performed on the face image, the facial feature point information on the face image is further extracted, and the facial feature point information is integrated into a face of the specified character image in the target region image, to obtain the integrated image, so that the specified character image in the integrated image has the facial feature point information extracted from the to-be-processed image while maintaining original appearance features, thereby implementing the function of seamlessly changing the face. According to this embodiment of the present disclosure, to reasonably ensure a fusion effect of the facial feature point information and the target region image, it may need to be ensured that the extracted facial feature point information meets the preset condition. For example, it may need to be ensured that the extracted facial feature point information includes all the feature point information of the face, and definition of the extracted facial feature point information is greater than a certain threshold. The operation of extracting facial feature point information on the face image is performed in response to determining that the facial feature point information on the face image meets the preset condition. Failure prompt information is generated in response to determining that the facial feature point information on the face image does not meet the preset condition. The failure prompt information may include prompt information of "Face fusion failed, please resubmit the picture".

In some implementations, the step of extracting facial feature point information from the target image information, and integrating the facial feature point information to a target region image, to obtain an integrated image may include: transmitting the target image information to a server, to obtain target character string information fed back by the server after face fusion processing is performed according to the target image information; and parsing the target character string information, to obtain an integrated image after the face fusion processing.

The implementation process of the face image fusion can not only be completed on the terminal, but also be completed on a server side. That is, the target image information, that is, the encoded and compressed character string information may be directly transmitted to the server. The server side may decode the character string information, to obtain the target image whose size and data size both meet the limiting condition, perform face feature scanning on the target image, to quickly determine the face image, perform processing such as grayscale correction or noise filtering on the face image, further extract the facial feature point information on the face image, and integrate the facial feature point information into the face of the specified character image in the target region image, to obtain the integrated image, so that the specified character image in the integrated image has the facial feature point information extracted from the to-be-processed image while maintaining original appearance features, thereby implementing the function of changing the face. According to this embodiment of the present disclosure, to reasonably ensure the fusion effect of the facial feature point information and the target region image, the server may need to ensure that the extracted facial feature point information meets the preset condition. For example, the server may need to ensure that the extracted facial feature point information includes all the feature point information of the face, and the definition of the extracted facial feature point information is greater than a certain threshold. When determining that the facial feature point information on the face image meets the preset condition, the server performs the operation of extracting facial feature point information on the face image. When determining that the facial feature point information on the face image does not meet the preset condition, the server transmits a failure prompt instruction to the terminal. When receiving the failure prompt instruction, the terminal generates the failure prompt information. The failure prompt information may be prompt information of "Face fusion failed, please resubmit the picture".

Further, to improve a transmission time, the server side also encodes the integrated image to generate reversible target character string information and feeds back the reversible target character string information to the terminal. After receiving the target character string information, the terminal decodes the target character string information, to obtain an integrated image after the face fusion processing.

In some implementations, the operation of parsing the target character string information, to obtain an integrated image after the face fusion processing may include: parsing the target character string information, to generate a preset quantity of integrated image addresses and shared image addresses; loading a preset quantity of integrated images and shared images according to the preset quantity of integrated image addresses and shared image addresses; and starting the video.

After receiving the target character string information fed back by the server, the terminal parses the target character string information, and parses the target character string information into the preset quantity of integrated image addresses and shared image addresses according to an agreed data structure. For example, the terminal may parse the target character string information into three integrated image addresses and one shared image address for sharing. The addresses are addresses on the server.

Further, the terminal may open the preset quantity of integrated image addresses and shared image addresses, to obtain the preset quantity of integrated images and shared images through loading, then separately load the images into the video, and start the video for playing after completing image loading. The target character string information may further separately include sequence information of the integrated image addresses the shared image addresses. The sequence is also a sequence of displaying the integrated images corresponding to the integrated image addresses. The server may give time points displayed by preset integrated images to the client. The client may determine the integrated images corresponding to the time points according to the sequence. For example, a $17^{th}$ second of the video corresponds to a first integrated image, an $18^{th}$ second corresponds to a second integrated image, and a $29^{th}$ second corresponds to a third integrated image.

Step 103. Overlay and display the integrated image on a video in response to detecting that the video is played to a corresponding preset playback interval.

In response to detecting that the video is played to the corresponding preset playback interval, that is, a video playback time point is within a time period from the starting time point to the ending time point of the preset playback interval, the integrated image may be overlaid and displayed on the video. That is, each frame of the playback image of the video displays the integrated image after the face fusion processing. Due to a phenomenon of persistence of vision, smooth playback of the playback image of the preset playback interval gives visual experience to the user that the face of the specified image in the video is transformed into the face in the to-be-processed image.

In some implementations, the operation of overlaying and displaying the integrated image on a video in response to detecting that the video is played to a corresponding preset playback interval may include: overlaying the integrated image on the set display component in response to detecting that the video is played to a starting point position of the corresponding preset playback interval, to obtain a target component, and overlaying and displaying the target component on the video; and removing the target component overlaid and displayed on the video in response to detecting that the video is played to an ending point position of the corresponding preset playback interval.

In response to detecting that the video is played to the starting point position of the corresponding preset playback interval, an integrated image corresponding to the preset playback interval is overlaid on the set display component (such as the Canvas canvas), to obtain a Canvas canvas on which the integrated image is drawn, the Canvas canvas is overlaid and displayed on the corresponding position of the video, and a face part in the video is overlaid by using the Canvas canvas, to display the integrated image after the face fusion processing. This gives the visual experience to the user that the face of the specified image in the video is transformed into the face in the to-be-processed image. For example, when the video is played to the $17^{th}$ second, the terminal renders the first integrated image into the canvas. When the video is played to the $18^{th}$ second, the terminal renders the second integrated image. When the video is played to the $29^{th}$ second, the terminal renders the third integrated image.

According to this embodiment of the present disclosure, a playback page of the video is also, for example, a HTML5 page. During playing of the video and display of the display component (the canvas), both a Video element forming the video and a Canvas element forming the display component may be added to a document object model (DOM) structure of the HTML5 page, so that both have the same size, and overlap in positions, and a layer of the Canvas element is higher than a layer of the Video element.

Further, the Canvas canvas overlaid and displayed on the video is removed in response to detecting that the video is played to the ending point position of the corresponding preset playback interval, so that subsequent playback recovers to normal, without affecting the normal watching of the user. A total quantity of frames of the canvas may be consistent with a total quantity of frames of the video. For example, if the video has 30 seconds, and 25 frames per second, the total quantity of frames of the canvas may be 30*25=750. When playing the video, the terminal determines a current frame of the video according to a current playback time point of the video. For example, when the video is played to a first second in $25^{th}$ frame, the terminal renders an integrated image of the 25$^{th}$ frame on the canvas. When the video is played to 1.2 seconds in 30$^{th}$ frame, the terminal renders an integrated image of the 30$^{th}$ frame on the canvas. A quantity of frames may be rounded.

In an implementation, after the integrated image after the face fusion processing is overlaid on the set display component (such as the Canvas canvas), a target component is obtained. A size of the target component can be reduced provided that the integrated image on the target component only retains a head part. Therefore, in response to detecting that the video is played to the starting point position of the corresponding preset playback interval, the target component is overlaid and displayed on the video, and only the head part of the specified image is overlaid on the video, so that better visual experience can be achieved, while the amount of data processed and transmitted by the terminal and the server can be reduced, thereby saving processing and transmission resources, and improving a processing speed.

In some implementations, before the operation of overlaying and displaying the integrated image on the video, the method may further include loading the integrated image into a preset playback interval in the video. For example, according to the previous examples, the first integrated image is loaded to the 17$^{th}$ second of the video, the second integrated image is loaded to the 18$^{th}$ second, and the third integrated image is loaded to the 29$^{th}$ second.

The human eyes have the phenomenon of persistence of vision. The phenomenon of persistence of vision is a phenomenon in which vision generated by light on a retina still retains for a period of time after the light stops motions. A specific application of the persistence of vision is film shooting and screening. The phenomenon is caused by a reaction speed of an optic nerve, and is the basis for the formation and propagation of visual media such as an animation and a movie. The vision actually relies on crystalline lenses of the eyes for imaging, and photoreceptor cells for sensing light. In addition, a light signal is converted into a nerve current and is then transmitted back to the brain to cause the human vision. The photoreceptor cells rely on some photopigments for sensitization. The formation of the photopigments may need to take a certain period of time. This forms the mechanism of persistence of vision. The video includes several playback pictures, that is, the video is formed by several playback images, but the several playback pictures are played at a rate of 24 frames per second. Therefore, a dynamic video is formed in the human eyes.

Further, to play the integrated image after the face fusion processing on the video, the preset playback interval in which the specified image in the integrated image appears in the video, that is, the starting time point and the ending time point at which the specified image appears in the video, may be determined in advance. The integrated image is preloaded to the corresponding position, of the playback image, between the starting time and the ending time, to implement the function of changing the face of the specified image in the video, so that when the subsequent video is played to the corresponding starting time point and ending time point, the image after being loaded and fused by using the integrated image and the playback picture may be directly played. Due to the phenomenon of persistence of vision, the smooth playback of the playback image of the preset playback interval gives the visual experience to the user that the face of the specified image in the video is transformed into the face in the to-be-processed image. This implementation is preloading the integrated image with the corresponding playback picture, so that the picture after the face fusion may be directly played during the subsequent playback.

In some implementations, the operation of loading the integrated image into a preset playback interval in the video may include: determining the preset playback interval corresponding to the video; obtaining a preset playback image within the preset playback interval; and loading the integrated image into a position corresponding to the preset playback image.

The starting time point and the ending time point at which the specified image in the integrated image appears in the video is determined, the preset playback images from the starting time point to the ending time point are obtained, and the integrated image is loaded into a position corresponding to each preset playback image, so that the specified image part after the face fusion processing in the integrated image overlays a specified image part of the each preset playback image, thereby implementing the function of changing the face of the specified image in the video.

In some implementations, the operation of loading the integrated image into a position corresponding to the preset playback image may include: overlaying the integrated image on the integrated display component, to obtain a target component; and loading the target component to the position corresponding to the preset playback image.

The dynamic rendering of the image can be implemented by using the Canvas canvas, so the integrated image after the face fusion processing may be overlaid on the integrated Canvas canvas, to obtain a target Canvas canvas. The target Canvas canvas is loaded to the position corresponding to the each preset playback image, so that the specified image after a face change on the target Canvas canvas overlays the specified image in the each preset playback image.

In an implementation, after the integrated image after the face fusion processing is overlaid on the integrated Canvas canvas, the size of the Canvas canvas may be reduced, provided that the integrated image on the Canvas canvas retains only the head part. Therefore, when the reduced Canvas canvas is loaded to the position corresponding to the each preset playback image, only the head part of the specified image in the each preset playback image may need to be overlaid, to achieve the better visual experience.

It can be learned from above that, in this embodiment of the present disclosure, a to-be-processed image is obtained, and the to-be-processed image is preprocessed, to obtain target image information; facial feature point information is extracted from the target image information, and the facial feature point information is integrated to a target region image, to obtain an integrated image; and overlaying and displaying the integrated image on a video in response to detecting that the video is played to a corresponding preset playback interval. In this solution, the facial feature point information is extracted from the preprocessed to-be-processed image, the facial feature point information is fused to the face position in the target region image, to obtain the integrated image, and the integrated image is overlaid and displayed on the video when the video is played to the preset playback interval, thereby implementing the function of changing the face of the character in the video during playing of the video, and greatly improving the flexibility and diversity of image information processing. In addition, in the method according to this embodiment of the present disclosure, the face change can be implemented without modifying a source video. In this solution, a to-be-fused entire video does not need to be transmitted to the server, only the fused image is modified, and the data amount of the fused image is relatively small. Therefore, a speed of generating the fused video is faster.

According to the method described above, further detailed descriptions are made below by using an example.

In this embodiment, descriptions are made by using an example in which the client is the image processing client, and the image information processing apparatus is specifically integrated into the terminal.

FIG. 3 is another schematic flowchart of an image information processing method according to one or more embodiments of the present disclosure. The image information processing method may be applicable to the foregoing computing device which may be a computer. The method process may include:

Step 201. The terminal obtains a to-be-processed image, obtains a length and a width of the to-be-processed image, compares the length with the width, and determines a longer side as a target side.

The user may operate the terminal to open the image processing client, and the image processing client may provide a feature code scanning control. The feature code scanning control provides a feature code scanning function. That is, the user may open, by triggering the feature code scanning control, a camera to scan a feature code provided by a third party. The feature code may be a two-dimensional code, also referred to as a 2-dimensional bar code. The common two-dimensional code is a QR Code, and a full name of QR is Quick Response. The QR Code is an ultra-popular coding manner on the terminal, can store more information than a conventional Bar Code, and can also represent more data types. A two-dimensional code/2-dimensional bar code records data symbol information by using black and white graphs distributed on a plane (in a two-dimensional direction) according to a specific rule by using a specific geometric figure. In code compiling, a concept of a bit stream "0" or "1" that constitutes a basis of internal logic of a computer is skillfully used, several geometric figures corresponding to a binary system are used to indicate text and numerical value information, and an image input device or an optoelectronic scanning device automatically recognizes and reads such information to implement automatic information processing. This has some similarities of a barcode technology: each code style has its specific character set; each character occupies a certain width; and there is a certain check function, and the like. In addition, the quick response code further has functions of automatically identifying information not in the same row and processing a rotation change point of a figure.

Figure 4:
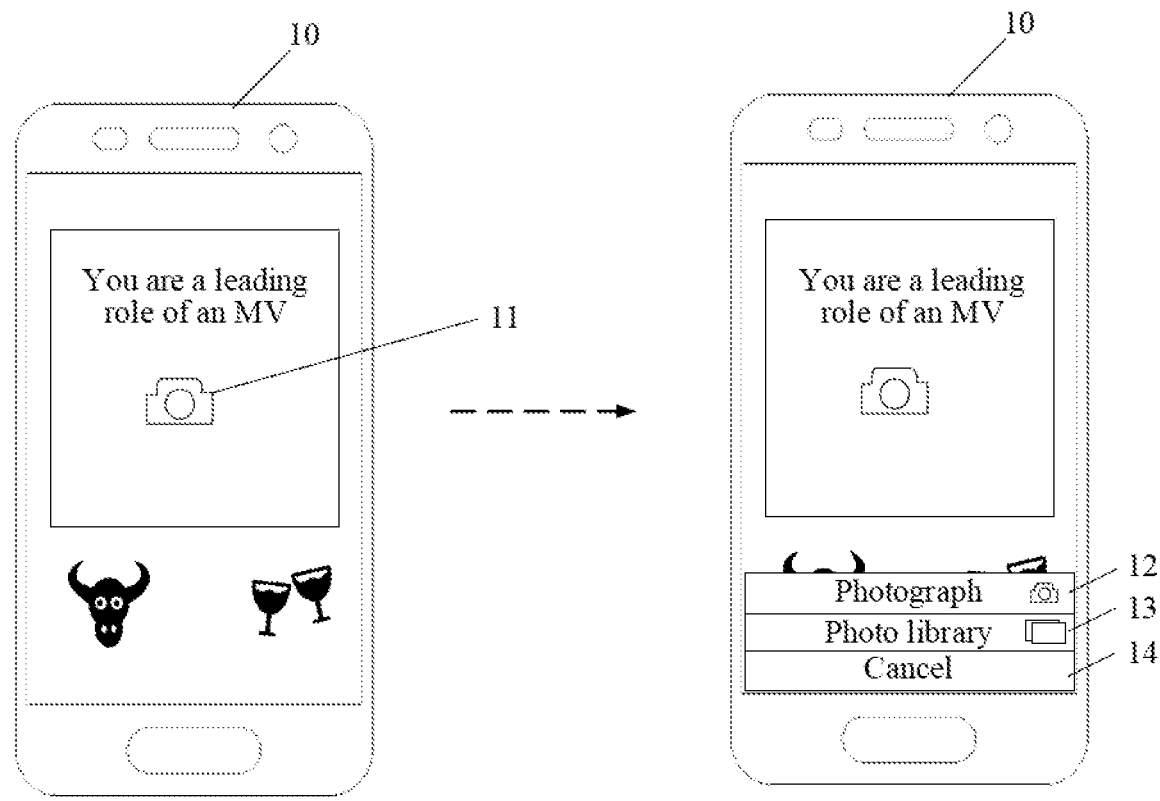
FIG. 4 is a schematic diagram of an image processing interface according to one or more embodiments of the present disclosure.

Further, after scanning, by using the feature code scanning function, the two-dimensional code provided by the third party, the image processing client may enter a corresponding user interface (UI). The user interface includes a target region image and a target video. The target region image is an image including a specified character image, and the target video is video whose data requires face fusion. As shown in FIG. 4, the terminal 10 enters the corresponding UI, and the UI includes an image selection control 11. When the user clicks on the image selection control 11, the terminal may provide a photographing control 12, a photo library control 13, and a cancel control 14. When the user clicks on the camera control 12, the terminal invokes a photographing component to acquire a to-be-processed image in real time. When the user clicks on the photo library control 13 and selects a manner of obtaining the to-be-processed image from a local album, the terminal invokes images stored in a memory, and displays the images on the UI in a form of lists. The user may select a corresponding to-be-processed image according to requirements. When the user clicks on the cancel control 14, the terminal returns to the UI. To process the image subsequently, a pixel size and a data size of the to-be-processed image are limited. For example, the pixels of the to-be-processed image are limited to be within 1080, and the data size of the to-be-processed image is limited to be within 500 KB. Because the pixels of the image and the length of the image may have a fixed relationship, an equivalent effect of adjusting the length is achieved according to the adjustment of the pixels.

Because the limited pixels are 1080 pixels, it may need to be ensured that both length pixels and width pixels of the to-be-processed image are within the limited pixels of 1080. Therefore, the adjustment ratio may need to be determined to adjust the length pixels and the width pixels of the to-be-processed image, so that both the length pixels and the width pixels are limited within 1080 pixels. To improve the efficiency of adjusting the pixels, the length pixels need to be compared with the width pixels, and a side with higher pixels is determined as the target side. For example, when the length pixels of the to-be-processed image are 3240 pixels and the width pixels are 2160 pixels, the length pixels with higher pixels are determined as a target side.

Step 202. The terminal obtains a length value corresponding to the target side; calculates a ratio of a preset length value to the length value of the target side, and determines the ratio as an adjustment ratio; and compresses the length and the width of the to-be-processed image according to the adjustment ratio.

The terminal obtains pixels, corresponding to the target side, of 3240 pixels and preset pixels of 1080 pixels, calculates a ratio of the preset pixels of 1080 pixels to the pixels of 3240 corresponding to the target side to be ⅓, and determines the ratio ⅓ as the adjustment ratio.

When a resolution of a picture is determined, for example, the resolution of the picture is 220 pixels per inch, a length of a corresponding image and pixels of the image have a certain fixed relationship, and it may be considered that a length of one centimeter of the image is equal to 72 pixels. Therefore, the length and the width of the to-be-processed image may be compressed according to the adjustment ratio. If the length of the to-be-processed image at 72 pixels per inch is 45 centimeters and the width is 30, the to-be-processed length may be compressed to 15 centimeters and the to-be-processed width may be compressed to 10 centimeters according to an adjustment ratio. A length pixel of the compressed to-be-processed image is: 15 multiplied by 72 is equal to 1080, and a width pixel is: 10 multiplied by 72 is equal to 720. This meets the pixel limiting condition.

Step 203. The terminal generates a display component, sets a size of the display component according to a size of the compressed to-be-processed image, and draws the compressed to-be-processed image on the set display component.

The display component may be a Canvas canvas. The terminal creates a Canvas canvas, sets a height attribute of the Canvas canvas to be equal to a length attribute of 1080 pixels of the compressed to-be-processed image, sets a width attribute to be equal to a width attribute of 720 pixels of the compressed to-be-processed image, and draws the compressed to-be-processed image on the set Canvas canvas with the height attribute and the width attribute. For example, the setting may be completed by executing the following statements: var canvas=document createElemet ("canvas"); canvas.width=img.width; canvas.height=img.height; var ctx=canvas.getContext ("2d"); ctx.drawImage (img, 0, 0, img.width, img.height).

The var canvas=document createElemet ("canvas") is a statement for generating the Canvas canvas, canvas.width=img.width is a statement for setting a width of the Canvas canvas to the width of the compressed to-be-processed image, and canvas.height=img.height is a statement for setting a length of the Canvas canvas to the length of the compressed to-be-processed image. var ctx=canvas.getContext ("2d") and ctx.drawImage (img, 0, 0, img.width, img.height) are statements for drawing the compressed to-be-processed image on the Canvas canvas.

Step 204. The terminal encodes the drawn display component, to generate target image information.

The terminal may encode the Canvas canvas on which the compressed to-be-processed image is drawn, change image quality of the compressed to-be-processed image, convert the Canvas canvas into encoded character string information, to compress the data size, and determine the encoded character string information as the target image information. For example, the setting may be completed by executing the following statement: var base64=canvas.toDataURL ("image/jpeg", 0.9).

The image quality of the compressed to-be-processed image is set to 0.9 by using a statement: var base64=canvas.toDataURL ("image/jpeg", 0.9), base64 encoding processing is performed, to obtain encoded character string information corresponding to base64, and the character string information is determined as target image information. After the image quality is changed, a corresponding data size is also reduced, and meets a limitation of 500 KB.

The character string information is reversible. That is, processed image information may be restored by analyzing the character string information.

Step 205. The terminal decodes the target image information, to obtain a compressed target image, and determines a face image on the target image.

The terminal may decode the character string information in the target image information to obtain a target image whose pixel size and data size both meet the limiting condition, and perform face scanning on the target image, to determine the face image on the target image.

Further, if a plurality of face images are scanned, a face image close to a center of the image may be preferentially determined as the target face image.

Step 206. The terminal determines whether facial feature point information on the face image meets a preset condition.

To reasonably ensure a fusion effect of a subsequent face and a face of a character in a video, the facial feature point information that is on the face image and is determined on the target image may need to be checked in advance. The preset condition is a success condition, and may specifically determine whether a quantity of facial feature points reach a preset threshold. When the face image is a side face, the quantity of facial feature points that can be extracted cannot reach the preset threshold. In addition, the preset condition may determine whether the definition of the facial feature points reaches the preset threshold.

Therefore, when the terminal determines that the facial feature point information on the face image meets a preset condition, step 207 is performed. When the terminal determines that the facial feature point information on the face image does not meet the preset condition, step 208 is performed.

Step 207. The terminal extracts the facial feature point information on the face image, and integrates the facial feature point information to a target region image, to obtain an integrated image.

When the terminal determines that the facial feature point information on the face image meets the preset condition, the terminal may extract corresponding facial feature point information after performing processing such as grayscale correction or noise filtering on the face image.

The target region image is an image including a specified character image, and a corresponding position is reserved on the target region image, such as a face position. The face position may be modified. The target region image may be default in the UI, or may be selected by the user. Details are not described herein.

Therefore, the extracted facial feature point information may be integrated to the face position in the target region image, so that the specified character image in the target region image has the facial features in the to-be-processed image, and also presents appearance features of the specified character image.

Step 208. The terminal generates failure prompt information.

When determining that the facial feature point information on the face image does not meet the preset condition, the terminal may generate the failure prompt information. For example, "The face image does not meet requirements, please re-upload again" to prompt the user to reselect the to-be-processed image.

Step 209. When detecting that a video is played to a starting point position of a corresponding preset playback interval, the terminal overlays the integrated image on the set display component, to obtain a target component, and overlays and displays the target component on the video.

Figure 5:
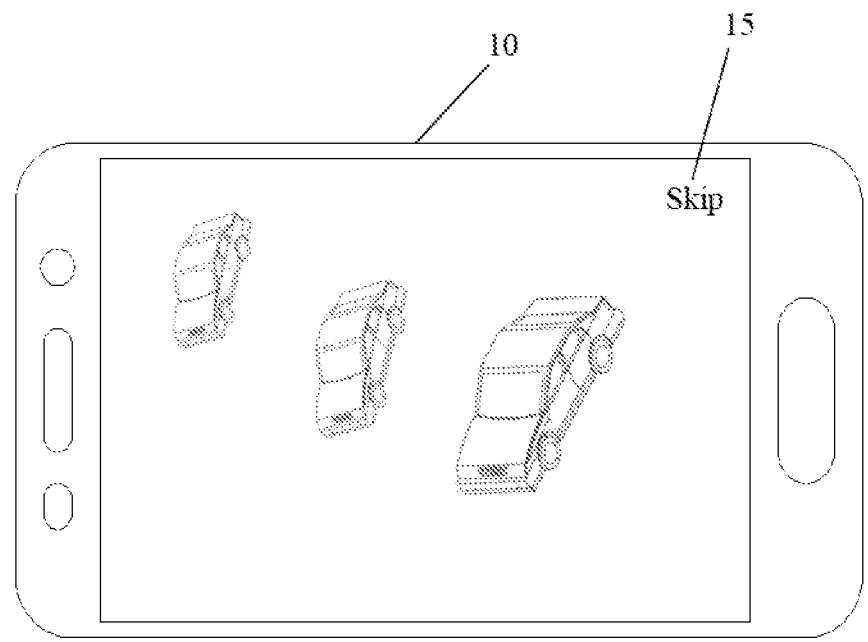
FIG. 5 is another schematic diagram of an image processing interface according to one or more embodiments of the present disclosure.

The terminal obtains the video and plays the video according to a starting time. As shown in FIG. 5, the playback image is a playback image in a non-preset playback interval, and the user may click on a skip control 15 to skip the picture.

Further, the video includes several playback images. The several playback images are played at a frequency of more than 24 frames per second, and the phenomenon of persistence of vision of the eyes are integrated, to implement a dynamic video. Therefore, the preset playback region in which a specified character image appears in the target region image may need to be determined, that is, that is, a starting time point and an ending time point. There may be one or more preset playback regions. In addition, a plurality of frames of preset playback images within the preset playback interval are determined. The terminal may overlay the integrated image on the integrated display component, to obtain a target component. That is, the terminal may overlay the integrated image after the face fusion processing on the Canvas canvas to obtain a target Canvas canvas. A size of the integrated image is equal to a size of the Canvas canvas.

Figure 6:
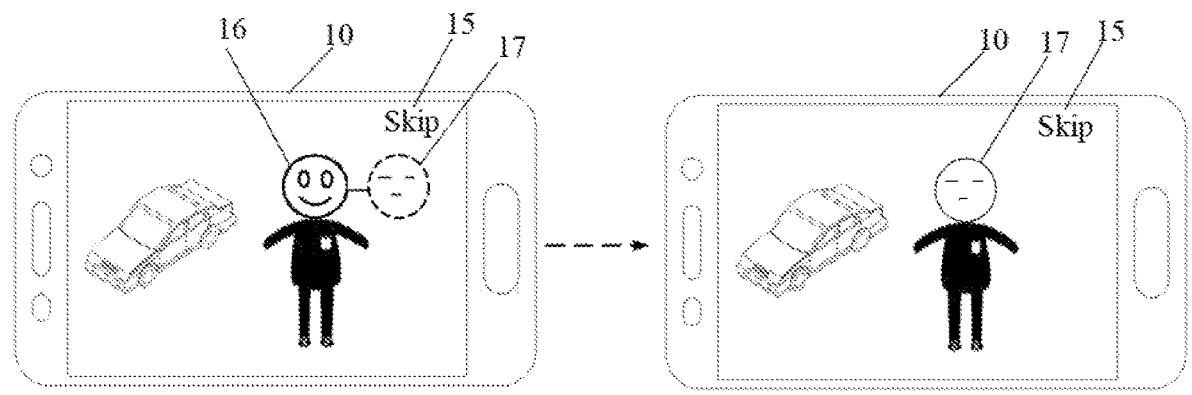
FIG. 6 is another schematic diagram of an image processing interface according to one or more embodiments of the present disclosure.

Because the Canvas canvas may dynamically render the bitmap image, when the video is played to the starting point position of the corresponding preset playback interval, the target Canvas canvas may be loaded to a corresponding position near a face of each frame of the preset playback image for dynamic rendering, to change a face of the specified character in the each frame of the preset playback image, without changing a background in the preset playback image. As shown in FIG. 6, when detecting that the video is played to the corresponding preset playback interval, that is, a playback picture in which a specified character image 16 appears, the terminal loads a target Canvas canvas 17, and integrates the target Canvas canvas 17 with the specified character image 16, so that the specified character image 16 after the face change is displayed on the each frame of the playback image in the preset playback interval, to achieve the effect of changing the face, thereby giving a smooth visual experience to the user.

Step 210. When detecting that the video is played to an ending point position of the corresponding preset playback interval, the terminal removes the target component overlaid and displayed on the video.

As illustratively shown in FIG. 6, the target Canvas canvas 17 overlaid and displayed on the video is removed in response to detecting that the video is played to the ending point position of the corresponding preset playback interval, so that subsequent playback recovers to normal, without affecting the normal watching of the user.

Figure 7:
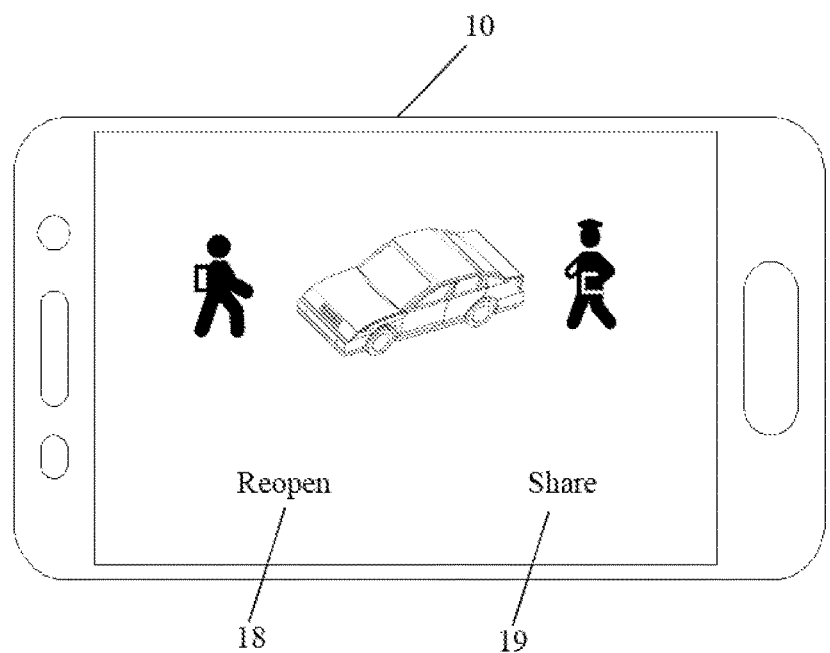
FIG. 7 is another schematic diagram of an image processing interface according to one or more embodiments of the present disclosure.

As illustratively shown in FIG. 7, when the playback of the video ends or the user clicks on the skip control, an end page is displayed. The user may repeat the playback again by clicking on a "reopen" control 18, or share the video after the face fusion with other friends by using instant messaging software by clicking on a "share" control, or upload the video after the face fusion to a corresponding server of the instant messaging software. During sharing, the shared image may be displayed on a shared page.

It may be seen from the above that, in this embodiment of the present disclosure, a to-be-processed image is obtained, a length and a width of the to-be-processed image are compressed, and a data size of the compressed to-be-processed image is compressed according to a Canvas canvas, to obtain target image information. The target image information is decoded, to obtain a target image whose size and data size both meet a condition, and the target image is scanned, to obtain a face image. Facial feature point information on the face image is extracted and fused to a target region image including a specified character image, to obtain an integrated image. In response to detecting that a video is played to a starting point position of a corresponding preset playback interval, the integrated image is overlaid on the set Canvas canvas, to obtain a target Canvas canvas, and the target Canvas canvas is overlaid and displayed on the video. In response to detecting that the video is played to an ending point position of the corresponding preset playback interval, the target Canvas canvas that is overlaid and displayed is removed. In this solution, the facial feature point information is extracted from the preprocessed to-be-processed image, the facial feature point information is fused to the face position in the target region image, to obtain the integrated image, and the integrated image is overlaid and displayed on the video when the video is played to the preset playback interval, thereby implementing the function of changing the face of the character in the video, and greatly improving the flexibility and diversity of image information processing.

To better implement the image information processing method provided in the embodiments of the present disclosure, an apparatus based on the foregoing image information processing method is further provided in the embodiments of the present disclosure. Nouns have meanings the same as those in the foregoing image information processing method. For specific implementation details, refer to the description in the method embodiments.

Figure 8A:
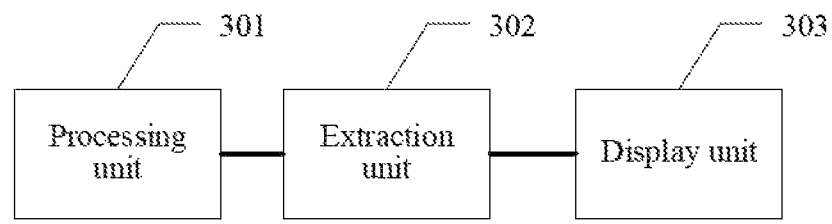
FIG. 8a is a schematic structural diagram of an image information processing apparatus according to one or more embodiments of the present disclosure.

FIG. 8a is a schematic structural diagram of an image information processing apparatus according to one or more embodiments of the present disclosure. The image information processing apparatus may include a processing unit 301, an extraction unit 302, a display unit 303, and the like, and is applicable to a computing device which may be a computer.

Each module/unit in various disclosed embodiments can be integrated in a processing unit, or each module/unit can exist separately and physically, or two or more modules/units can be integrated in one unit. The modules/units as disclosed herein can be implemented in the form of hardware (e.g., processing circuitry and/or memory) or in the form of software functional unit(s) (e.g., developed using one or more computer programming languages), or a combination of hardware and software. Each module/unit or submodule/subunit can be implemented using one or more processors (or processors and memory). Likewise, a processor (or processor and memory) can be used to implement one or more modules/units or submodules/subunits. Moreover, each module/unit may be developed using a computer programming language, or be part of an overall module/unit that is developed using a computer programming language to encompass the functionalities of each module/unit.

The processing unit 301 is configured to: obtain a to-be-processed image, and preprocess the to-be-processed image, to obtain target image information.

The processing unit 301 may obtain the to-be-processed image by using the following operations: A certain client such as an image processing client on a terminal is opened. The image processing client displays a main interface, and the displayed main interface may display a plurality of video display controls. When a user clicks on a target video display control on the main interface, the client enters a poster display interface corresponding to the target video display control. The poster display interface may include an image selection control, and the image selection control is configured to trigger a quick entry of obtaining the to-be-processed image. After detecting that the user clicks on the image selection control, the processing unit 301 may invoke a camera assembly to acquire the to-be-processed image. Optionally, the processing unit 301 may alternatively invoke an album on the terminal, and further select a certain target picture in the album as the to-be-processed image.

Further, after obtaining the to-be-processed image, the processing unit 301 may preprocess the to-be-processed image. A preprocessing manner may be performing noise reduction processing, pixel adjustment processing, data size adjustment processing, or the like on the image, to obtain the target image information. The target image information after the preprocessing may be directly subject to subsequent feature extraction.

In some implementations, the processing unit 301 may be configured to: obtain the to-be-processed image, and compress a size and a data size of the to-be-processed image, to obtain the target image information.

With the development of a camera and screen display pixels of the terminal, a pixel size and a data size of an image can be large. To accurately and quickly process the image subsequently, the processing unit 301 correspondingly limits a pixel size and the data size of the to-be-processed image. For example, the to-be-processed image is limited to 500 KB and 1080 pixels. Pixels refer to small blocks that form the image. Each of the small blocks has a clear position and assigned color values, and the colors and positions of the small blocks determine the appearance of the image. The pixels may be regarded as an indivisible unit or element in an entire image. Indivisibility means that the pixels cannot be recut into a smaller unit or element, and exist as a small block with a single color. Each bitmap includes a certain quantity of pixels. The pixels determine a size of the image presented on a screen.

Therefore, the processing unit 301 may need to compress the size and the data size of the to-be-processed image, so that the to-be-processed image meets the limitations of the data size of 500 KB and the size of 1080 pixels, and the compressed target image information that meets the condition is determined as the target image information.

Figure 8B:
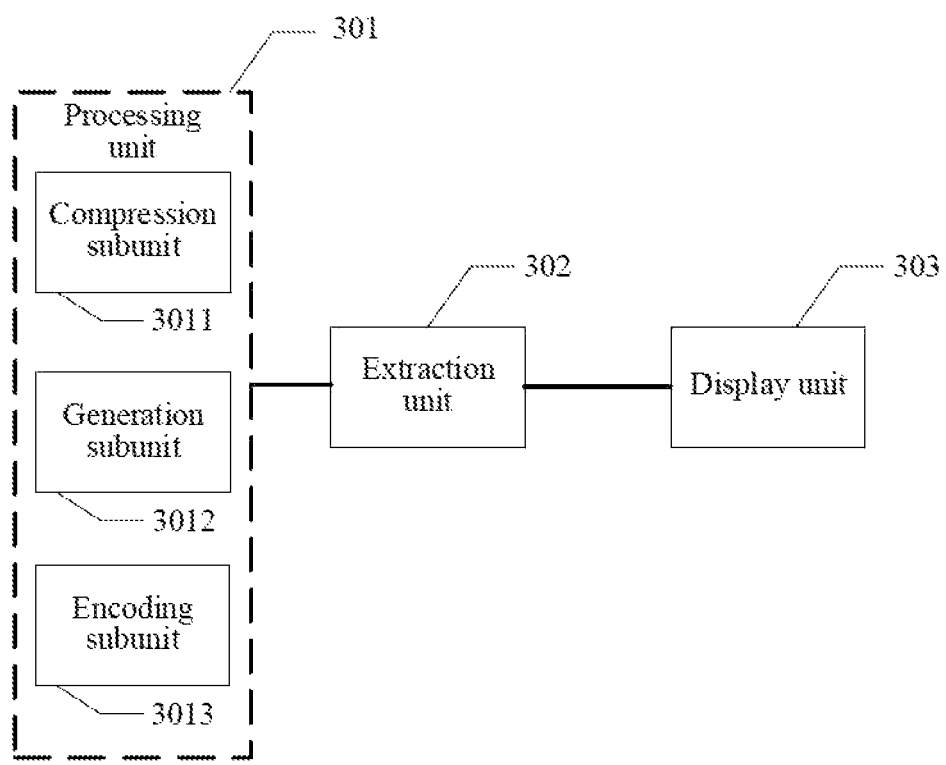
FIG. 8b is another schematic structural diagram of an image information processing apparatus according to one or more embodiments of the present disclosure.

In some implementations, as shown in FIG. 8b, the processing unit 301 may include a compression subunit 3011, a generation subunit 3012, and an encoding subunit 3013 as follows:

The compression subunit 3011 is configured to: obtain the to-be-processed image, and compress the size of the to-be-processed image.

The generation subunit 3012 is configured to: generate a display component, set a size of the display component according to a size of the compressed to-be-processed image, and draw the compressed to-be-processed image on the set display component.

The encoding subunit 3013 is configured to encode the drawn display component, to generate the target image information.

When a resolution of the picture is determined, the pixels and a length may have a fixed relationship. For example, a resolution of each picture is generally 72 dots per inch (DPI). That is, each inch includes 72 pixels. In this case, one centimeter is equal to 28 pixels. Therefore, the compression subunit 3011 may compress the size of the to-be-processed image according to a ratio relationship between pixels of the to-be-processed image and limited pixels.

Further, to correspondingly compress the data size of the to-be-processed image, the generation subunit 3012 may need to generate a display component. The display component may be a Canvas component, and the Canvas component may be commonly understood as a Canvas canvas. The Canvas canvas has a height attribute and a width attribute. The height attribute is a height of the Canvas canvas. Like an image, this attribute may be specified as an integer pixel value or a percentage of a window height. When this value changes, any drawing that has been completed on the canvas is erased. A default value of the height attribute is 150. The width attribute is a width of the canvas. Like an image, this attribute may be specified as an integer pixel value or a percentage of a window width. When this value changes, any drawing that has been completed on the canvas is erased. A default value of the width attribute is 300. The height attribute and the width attribute of the Canvas canvas may be set according to a size of the compressed to-be-processed image. The height attribute and the width attribute of the Canvas canvas may be equal to the size of the compressed to-be-processed image, and the compressed to-be-processed image is drawn on the Canvas canvas.

Correspondingly, after drawing the compressed to-be-processed image on the Canvas canvas, the encoding subunit 3013 may change the image quality of the compressed to-be-processed image by using a toDataURL method of the Canvas canvas, and compress the compressed to-be-processed image into character string information, to further change the data size of the compressed to-be-processed image, so that the compressed to-be-processed image meets a limitation requirement of the data size. The character string information is reversible. That is, the character string information may be decoded, to obtain a compressed to-be-processed image. The character string information that meets the pixel size and the data size is determined as the target image information.

In some implementations, the compression subunit 3011 may be configured to: obtain the to-be-processed image; obtain a length and a width of the to-be-processed image; compare the length with the width, and determine a longer side as a target side; and compress the size of the to-be-processed image according to a length value of the target side.

The pixels of the image and the length of the image may have a fixed relationship. Therefore, an equivalent effect of adjusting the length is achieved according to the adjustment of the pixels. That is, the compression subunit 3011 may obtain a length pixel (that is, the length) and a width pixel (that is, the width) of the to-be-processed image. The length pixel is a pixel value of the length of the to-be-processed image, and the width pixel is a pixel value of the width of the to-be-processed image. To limit the pixels of the to-be-processed image, only an adjustment of a pixel of a larger-pixel side in the length pixel and the width pixel may need to be limited, and a pixel of a smaller-pixel side definitely also meets the limitation condition. Therefore, the length pixel may be compared with the width pixel, the side with the larger pixel is determined as the target side, a ratio relationship between the pixel value of the target side and the limited pixels is obtained, and the size of the to-be-processed image is compressed according to the ratio relationship.

In some implementations, the compression subunit 3011 may be further configured to: obtain the to-be-processed image; obtain a length and a width of the to-be-processed image; compare the length with the width, and determine a longer side as a target side; obtain a length value corresponding to the target side; calculate a ratio of a preset length value to the length value of the target side, and determine the ratio as an adjustment ratio; and compress the length and the width of the to-be-processed image according to the adjustment ratio.

The pixels of the image and the length of the image may have a fixed relationship. Therefore, an equivalent effect of adjusting the length is achieved according to the adjustment of the pixels. That is, the compression subunit 3011 may obtain a pixel (that is, the length value) corresponding to the target side with a larger pixel value (that is, a larger length value), and the preset length value (that is, a preset pixel) may be 540 pixels or 1080 pixels; calculate a ratio of the preset pixel to the pixel of the target side; and determine the ratio as the adjustment ratio. Because the pixels and the length have a fixed relationship, the length and the width of the to-be-processed image may be compressed according to the adjustment ratio, and pixels of the compressed to-be-processed image meet the requirement of limited pixels.

The extraction unit 302 is configured to: extract facial feature point information from the target image information, and integrate the facial feature point information to a target region image, to obtain an integrated image, the target region image belonging to a playback image in a corresponding preset playback interval of a video.

Because the target image information includes the reversible character string information, the extraction unit 302 may decode the character string information to obtain a target image whose size (that is, the pixel size) and data size both meet the limiting condition, and may quickly determine a face image from the target image information. Because pattern features, for example, a histogram feature, a color feature, a template feature, a structural feature, and a Haar-like feature, included in the face image are very rich, feature scanning may be performed on the target image, to quickly determine the face image.

Further, some target images may include a plurality of face images. Therefore, when the plurality of face images are detected, a face image close to a center of the image may be determined as the target face image, image preprocessing is performed on the target face image, and facial feature point information on the target face image is further extracted. The facial feature point information may include geometric descriptions of local composition points such as eyes, a nose, a mouth, and a chin. The target region image is an image of a specified character in the video. Face-level fusion is performed on the extracted facial feature point information and the specified image in the target region image, to obtain an integrated image. The integrated image not only has facial features of the to-be-processed image, but also presents appearance features of the specified image, thereby implementing the function of seamlessly changing the face.

In some implementations, the extraction unit 302 may be configured to: decode the target image information, to obtain a target image; determine a face image on the target image; determine whether the facial feature point information on the face image meets a preset condition; and extract facial feature point information on the face image in response to detecting that the facial feature point information on the face image meets the preset condition, and integrate the facial feature point information to the corresponding position of the target region image, to obtain the integrated image; or generate failure prompt information in response to determining that the facial feature point information on the face image does not meet the preset condition.

The image information is the reversible character string information. Therefore, the extraction unit 302 may decode the target image information, to obtain the target image whose size and data size after the compression both meet the limiting condition, perform face feature scanning on the target image, to quickly determine the face image, perform processing such as grayscale correction or noise filtering on the face image, further extract the facial feature point information on the face image, and integrate the facial feature point information into a face of the specified character image in the target region image, to obtain the integrated image, so that the specified character image in the integrated image has the facial feature point information extracted from the to-be-processed image while maintaining original appearance features, thereby implementing the function of seamlessly changing the face. According to this embodiment of the present disclosure, to reasonably ensure the fusion effect of the facial feature point information and the target region image, it may need to be ensured that the extracted facial feature point information meets the preset condition. For example, it may need to be ensured that the extracted facial feature point information includes all the feature point information of the face, and the definition of the extracted facial feature point information is greater than a certain threshold. In response to determining that the facial feature point information on the facial image meets the preset condition, the operation of extracting facial feature point information on the face image is performed. Failure prompt information is generated in response to determining that the facial feature point information on the face image does not meet the preset condition. The failure prompt information may be prompt information of "Face fusion failed, please resubmit the picture".

In some implementations, the extraction unit 302 may be further configured to: transmit the target image information to a server, to obtain target character string information fed back by the server after face fusion processing is performed according to the target image information; and parse the target character string information, to obtain an integrated image after the face fusion processing.

The implementation process of the face image fusion can not only be completed on the terminal, but also be completed on a server side. That is, the extraction unit 302 may directly transmit the target image information, that is, the encoded and compressed character string information to the server. The server side may decode the character string information, to obtain the target image whose size and data size after the compression both meet the limiting condition, perform face feature scanning on the target image, to quickly determine the face image, perform processing such as grayscale correction or noise filtering on the face image, further extract the facial feature point information on the face image, and integrate the facial feature point information into the face of the specified character image in the target region image, to obtain the integrated image, so that the specified character image in the integrated image has the facial feature point information extracted from the to-be-processed image while maintaining original appearance features, thereby implementing the function of changing the face. According to this embodiment of the present disclosure, to reasonably ensure the fusion effect of the facial feature point information and the target region image, the server may need to ensure that the extracted facial feature point information meets the preset condition. For example, the server may need to ensure that the extracted facial feature point information includes all the feature point information of the face, and the definition of the extracted facial feature point information is greater than a certain threshold. When determining that the facial feature point information on the face image meets the preset condition, the server performs the operation of extracting facial feature point information on the face image. When determining that the facial feature point information on the face image does not meet the preset condition, the server transmits a failure prompt instruction to the terminal. When receiving the failure prompt instruction, the terminal generates the failure prompt information. The failure prompt information may be prompt information of "Face fusion failed, please resubmit the picture".

Further, to improve a transmission time, the server side also encodes the integrated image to generate reversible target character string information and feeds back the reversible target character string information to the terminal. After receiving the target character string information, the extraction unit 302 decodes the target character string information, to obtain an integrated image after the face fusion processing.

In some implementations, the extraction unit 302 may be further configured to: transmit the target image information to a server, to obtain target character string information fed back by the server after face fusion processing is performed according to the target image information; parse the target character string information, to generate a preset quantity of integrated image addresses and shared image addresses; load a preset quantity of integrated images and shared images according to the preset quantity of integrated image addresses and shared image addresses; and start the video.

After receiving the target character string information fed back by the server, the extraction unit 302 parses the target character string information, and parses the target character string information into the preset quantity of integrated image addresses and shared image addresses according to an agreed data structure. For example, the extraction unit may parse the target character string information into three integrated image addresses and one shared image address for sharing.

Further, the extraction unit 302 may open the preset quantity of integrated image addresses and shared image addresses, to obtain the preset quantity of integrated images and shared images through loading, then separately load the images into the video, and start the video for playing after completing image loading.

The display unit 303 is configured to overlay and display the integrated image on a video in response to detecting that the video is played to a corresponding preset playback interval.

When detecting that the video is played to the corresponding preset playback interval, that is, a video playback time point is within a time period from the starting time point to the ending time point of the preset playback interval, the display unit 303 may overlay and display the integrated image on the video. That is, each frame of the playback image of the video displays the integrated image after the face fusion processing. Due to a phenomenon of persistence of vision, smooth playback of the playback image of the preset playback interval gives visual experience to the user that the face of the specified image in the video is transformed into the face in the to-be-processed image.

In some implementations, the display unit 303 may be further configured to: overlay the integrated image on the set display component in response to detecting that the video is played to a starting point position of the corresponding preset playback interval, to obtain a target component, and overlay and display the target component on the video; and remove the target component overlaid and displayed on the video in response to detecting that the video is played to an ending point position of the corresponding preset playback interval.

In response to detecting that the video is played to the starting point position of the corresponding preset playback interval, the display unit 303 overlays an integrated image corresponding to the preset playback interval on the set display component (such as the Canvas canvas), to obtain a Canvas canvas on which the integrated image is drawn, overlays and displays the Canvas canvas on the corresponding position of the video, and overlays a face part in the video by using the Canvas canvas, to display the integrated image after the face fusion processing. This gives the visual experience to the user that the face of the specified image in the video is transformed into the face in the to-be-processed image.

Further, the display unit 303 removes the Canvas canvas overlaid and displayed on the video in response to detecting that the video is played to the ending point position of the corresponding preset playback interval, so that subsequent playback recovers to normal, without affecting the normal watching of the user.

For specific implementation of the foregoing units, refer to the foregoing embodiments, which are not described repeatedly herein.

It can be learned from above that, in this embodiment of the present disclosure, the processing unit 301 obtains a to-be-processed image, and preprocesses the to-be-processed image, to obtain target image information; the extraction unit 302 extracts facial feature point information from the target image information, and integrates the facial feature point information to a target region image, to obtain an integrated image; and the display unit 303 overlays and displays the integrated image on a video in response to detecting that the video is played to a corresponding preset playback interval. In this solution, the facial feature point information is extracted from the preprocessed to-be-processed image, the facial feature point information is fused to the face position in the target region image, to obtain the integrated image, and the integrated image is overlaid and displayed on the video when the video is played to the preset playback interval, thereby implementing the function of changing the face of the character in the video during playing of the video, and greatly improving the flexibility and diversity of image information processing. In addition, in the method according to the embodiments of the present disclosure, the face change can be implemented without modifying a source video. In this solution, a to-be-fused entire video does not need to be transmitted to the server, only the fused image is modified, and the data amount of the fused image is relatively small. Therefore, a speed of generating the fused video is faster.

Figure 9:
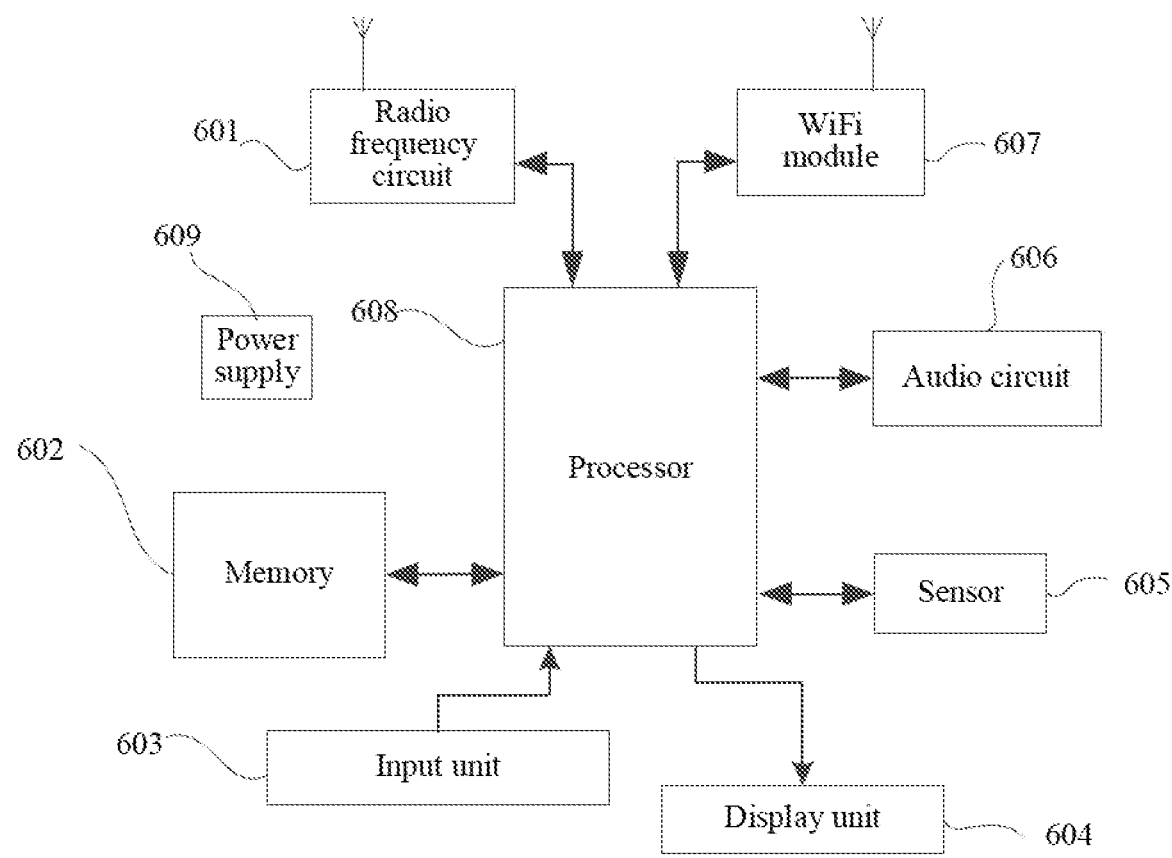
FIG. 9 is a schematic structural diagram of a terminal according to one or more embodiments of the present disclosure.

The embodiments of the present disclosure further provide a terminal. As shown in FIG. 9, the terminal may include components such as a radio frequency (RF) circuit 601, a memory 602 including one or more computer-readable storage media, an input unit 603, a display unit 604, a sensor 605, an audio circuit 606, a Wireless Fidelity (WiFi) module 607, a processor 608 including one or more processing cores, a power supply 609, and the like. A terminal structure shown in FIG. 9 does not constitute a limitation to the terminal, and the terminal may include more or fewer components than those shown in the figure, or some components may be integrated, or a different component deployment may be used.

The memory 602 may be configured to store a software program and a module. The processor 608 runs the software program and module that are stored in the memory 602, to implement various functional applications and image information processing. The memory 602 may mainly include a program storage area and a data storage area. The program storage area may store an operating system, an application program required by at least one function (for example, a sound playback function and an image playback function), or the like. The data storage area may store data (for example, audio data and a phone book) created according to use of the terminal. In addition, the memory 602 may include a high speed random access memory, and may further include a non-volatile memory, such as at least one magnetic disk storage device, a flash memory, or another volatile solid storage device. The memory 602 may further include a memory controller, so as to provide access of the processor 608 and the input unit 603 to the memory 602.

The input unit 603 may be configured to receive input digit or character information, and generate a keyboard, mouse, joystick, optical, or track ball signal input related to a user setting and function control. Specifically, in a specific embodiment, the input unit 603 may include a touch-sensitive surface and another input device. The touch-sensitive surface, which may also be referred to as a touch screen or a touch panel, may collect a touch operation of a user on or near the touch-sensitive surface (such as an operation of a user on or near the touch-sensitive surface by using any suitable object or accessory such as a finger or a stylus), and drive a corresponding connection apparatus according to a preset program. Optionally, the touch-sensitive surface may include two parts: a touch detection apparatus and a touch controller. The touch detection apparatus detects a touch orientation of the user, detects a signal brought through the touch operation, and transmits the signal to the touch controller. The touch controller receives touch information from the touch detection apparatus, converts the touch information into a contact coordinate, then transmits the contact coordinate to the processor 608, receives and executes a command transmitted by the processor 608. In addition, the touch-sensitive surface may be implemented in a plurality of types, such as a resistive type, a capacitive type, an infrared type, and a surface acoustic wave type. In addition to the touch-sensitive surface, the input unit 603 may further include the another input device. Specifically, the another input device may include, but not limited to, one or more of a physical keyboard, a function key (such as a volume control key or a switch key), a trackball, a mouse, or a joystick.

The display unit 604 may be configured to display information inputted by the user or provided for the user, and various graphical user interfaces of the terminal. The graphical user interfaces may be composed of graphics, text, icons, videos, and any combination thereof. The display unit 604 may include a display panel. Optionally, the display panel may be configured by using a liquid crystal display (LCD), an organic light-emitting diode (OLED), or the like. Further, the touch-sensitive surface may overlay the display panel. After detecting a touch operation on or near the touch-sensitive surface, the touch-sensitive surface transfers the touch operation to the processor 608 to determine a type of a touch event, and then the processor 608 provides corresponding visual output on the display panel according to the type of the touch event. Although, in FIG. 9, the touch-sensitive surface and the display panel are used as two separate components to implement input and output functions, in some embodiments, the touch-sensitive surface and the display panel may be integrated to implement the input and output functions.

The terminal may further include at least one sensor 605, such as an optical sensor, a motion sensor, and other sensors. Specifically, the optical sensor may include an ambient light sensor and a proximity sensor. The ambient light sensor may adjust brightness of the display panel according to brightness of the ambient light. The proximity sensor may switch off the display panel and/or backlight when the terminal is moved to an ear. As one type of the motion sensor, a gravity acceleration sensor may detect a value of acceleration at each direction (which generally is triaxial), may detect a value and a direction of the gravity when being static, and may be configured to identify an application of a mobile phone gesture (such as a handover between horizontal and longitudinal screens, a related game, and gesture calibration of a magnetometer), a related function of vibration identification (such as a pedometer and a knock), and the like. Another sensor, such as a gyroscope, a barometer, a hygrometer, a thermometer, and an infrared sensor, which can be configured in the terminal is not described herein again.

The audio circuit 606, a speaker, and a microphone may provide an audio interface between the user and the terminal. The audio circuit 606 may transmit, to the speaker, an electrical signal obtained through conversion of the received audio data, and the speaker converts the electrical signal into a sound signal to be outputted. According to another aspect, the microphone converts the collected sound signal into an electrical signal, the electrical signal is converted into audio data after received by the audio circuit 606, and the audio data is transmitted to another terminal through the RF circuit 601 after being outputted to the processor 608 for processing, or the audio data is outputted to the memory 602 for further processing. The audio circuit 606 may further include an earplug jack, to provide communication between a peripheral headset and the terminal.

WiFi belongs to a short distance wireless transmission technology. The terminal may help, by using the WiFi module 607, the user transmit and receive an email, browse a webpage, and access streaming media. This provides wireless broadband Internet access for the user. Although FIG. 9 shows the WiFi module 607, it may be understood that the WiFi module is not a necessary component of the terminal, and the WiFi module may be omitted as required provided that the scope of the essence of the present disclosure is not changed.

The processor 608 is the control center of the terminal, and is connected to various parts of the mobile phone by using various interfaces and lines. By running or executing the software program and/or module stored in the memory 602, and invoking data stored in the memory 602, the processor performs various functions and data processing of the terminal, thereby performing overall monitoring on the mobile phone. Optionally, the processor 608 may include one or more processing cores. The processor 608 may integrate an application processor and a modem. The application processor mainly processes an operating system, a user interface, an application, and the like. The modem mainly processes wireless communication. It may be understood that the foregoing modem may either not be integrated into the processor 608.

The terminal further includes the power supply 609 (such as a battery) for supplying power to the components. The power supply may be logically connected to the processor 608 by using a power management system, thereby implementing functions such as charging, discharging, and power consumption management by using the power management system. The power supply 609 may further include one or more of a direct current or alternating current power supply, a re-charging system, a power failure detection circuit, a power supply converter or inverter, a power supply state indicator, and any other component.

Although not shown, the terminal may further include a camera, a Bluetooth module, and the like. Details are not described herein again. Specifically, in this embodiment, the processor 608 in the terminal may load executable files corresponding to processes of one or more applications to the memory 602 according to the following instructions, and the processor 608 runs an application stored in the memory 602, to implement various functions: obtaining a to-be-processed image, and preprocessing the to-be-processed image, to obtain target image information; extracting facial feature point information from the target image information, and integrating the facial feature point information to a target region image, to obtain an integrated image, the target region image belonging to a playback image in a corresponding preset playback interval of a video; and overlaying and displaying the integrated image on a video in response to detecting that the video is played to a corresponding preset playback interval.

In the foregoing embodiments, the descriptions of the embodiments have respective focuses. For a part that is not described in detail in an embodiment, refer to detailed description of the image information processing method in the foregoing. Details are not described herein again.

All or some steps of the methods of the foregoing embodiments may be implemented through instructions, or may be implemented through instructions controlling relevant hardware, and the instructions may be stored in a computer-readable storage medium, and may be loaded and executed by a processor.

Accordingly, the embodiments of the present disclosure provide a non-volatile storage medium, storing a plurality of instructions, the instructions being configured to be loaded by a processor, to perform the operations in any image information processing method according to the embodiments of the present disclosure. For example, the instructions may perform the following steps: obtaining a to-be-processed image, and preprocessing the to-be-processed image, to obtain target image information; extracting facial feature point information from the target image information, and integrating the facial feature point information to a target region image, to obtain an integrated image, the target region image belonging to a playback image in a corresponding preset playback interval of a video; and overlaying and displaying the integrated image on a video in response to detecting that the video is played to a corresponding preset playback interval.

For specific implementations of the foregoing operations relative to the non-volatile storage medium, reference may be made to the foregoing embodiments in relation to the method and the apparatus discussed herein. Repetitive details are not described herein again in favor of brevity.

The storage medium may include: a read-only memory (ROM), a random access memory (RAM), a magnetic disk, an optical disc, or the like.

Because the instructions stored in the storage medium may perform the steps of any image information processing method in the embodiments of the present disclosure, the instructions can implement beneficial effects that may be implemented by any image information processing method in the embodiments of the present disclosure. For details, refer to the foregoing embodiments. Details are not described herein again.

The image information processing method and apparatus, and the storage medium provided in the embodiments of the present disclosure are described above in detail. Although the principles and implementations of the present disclosure are described by using specific examples in the present disclosure, the descriptions of the foregoing embodiments are merely intended to help understand the method, the apparatus, and the storage medium of the present disclosure. A person of ordinary skill in the art may conveniently make variations or modifications according to spirit of the present disclosure. Therefore, the protection scope of the present disclosure shall be subject to the protection scope of the claims.

What is claimed is:

1. An image information processing method, performed by a computing device, the method comprising:
    obtaining a candidate image;
    compressing a size of the candidate image to obtain a compressed image;
    generating a display component and drawing the compressed image on the display component;
    encoding the drawn display component to generate the target image information;
    extracting facial feature point information from the target image information, and integrating the facial feature point information to a target region image to obtain an integrated image, the target region image being part of a playback image in a preset playback interval of a video; and
    displaying the integrated image on the video in response to detecting that the video is played to the preset playback interval.

2. The processing method according to claim 1, further comprising:
    before drawing the compressed image on the display component, setting a size of the display component according to a size of the compressed image.

3. The processing method according to claim 2, wherein extracting facial feature point information from the target image information and integrating the facial feature point information to the target region image to obtain the integrated image comprises:
    decoding the target image information to obtain a target image;
    determining a face image on the target image; and
    extracting facial feature point information on the face image and integrating the facial feature point information to the target region image to obtain the integrated image.

4. The processing method according to claim 3, wherein before extracting facial feature point information on the face image, the method further comprises:
    determining whether the facial feature point information on the face image meets a preset condition; and
    performing the operation of extracting facial feature point information on the face image in response to determining that the facial feature point information on the face image meets the preset condition; or
    generating failure prompt information in response to determining that the facial feature point information on the face image does not meet the preset condition.

5. The processing method according to claim 2, wherein extracting facial feature point information from the target image information and integrating the facial feature point information to the target region image to obtain the integrated image comprises:
    transmitting the target image information to a server to obtain target character string information fed back by the server after face fusion processing is performed according to the target image information; and
    parsing the target character string information to obtain the integrated image after the face fusion processing.

6. The processing method according to claim 5, wherein parsing the target character string information to obtain the integrated image after the face fusion processing comprises:
    parsing the target character string information, to generate a preset quantity of integrated image addresses and shared image addresses;
    loading a preset quantity of integrated images and shared images according to the preset quantity of integrated image addresses and shared image addresses; and
    starting the video.

7. The processing method according to claim 2, wherein displaying the integrated image on the video in response to detecting that the video is played to the preset playback interval comprises:
    overlaying the integrated image on the set display component in response to detecting that the video is played to a starting point position of the preset playback interval, to obtain a target component, and overlaying and displaying the target component on the video; and
    removing the target component overlaid and displayed on the video in response to detecting that the video is played to an ending point position of the preset playback interval.

8. The processing method according to claim 1, wherein compressing the size of the candidate image comprises:
    obtaining a length and a width of the candidate image;
    comparing the length with the width, and determining a longer side as a target side; and
    compressing the size of the candidate image according to a length value of the target side.

9. The processing method according to claim 8, wherein compressing the size of the candidate image according to the length value of the target side comprises:
    obtaining the length value corresponding to the target side;

calculating a ratio of a preset length value to the length value of the target side, and determining the ratio as an adjustment ratio; and compressing the length and the width of the candidate image according to the adjustment ratio.

10. An image information processing apparatus, comprising: a memory storing computer program instructions; and a processor coupled to the memory and configured to executing the computer program instructions and perform:

obtaining a candidate image;

compressing a size of the candidate image to obtain a compressed image;

generating a display component and drawing the compressed image on the display component;

encoding the drawn display component to generate the target image information;

extracting facial feature point information from the target image information, and integrating the facial feature point information to a target region image to obtain an integrated image, the target region image being part of a playback image in a preset playback interval of a video; and displaying the integrated image on the video in response to detecting that the video is played to the preset playback interval.

11. The image information processing apparatus of claim 10, wherein the processor is further configured to perform: before drawing the compressed image on the display component, setting a size of the display component according to a size of the compressed image.

12. The image information processing apparatus of claim 10, wherein compressing the size of the candidate image comprises:

obtaining a length and a width of the candidate image;

comparing the length with the width, and determining a longer side as a target side; and compressing the size of the candidate image according to a length value of the target side.

13. The image information processing apparatus of claim 12, wherein compressing the size of the candidate image according to the length value of the target side comprises:

obtaining the length value corresponding to the target side;

calculating a ratio of a preset length value to the length value of the target side, and determining the ratio as an adjustment ratio; and compressing the length and the width of the candidate image according to the adjustment ratio.

14. The image information processing apparatus of claim 10, wherein extracting facial feature point information from the target image information and integrating the facial feature point information to the target region image to obtain the integrated image comprises:

decoding the target image information to obtain a target image;

determining a face image on the target image; and extracting facial feature point information on the face image and integrating the facial feature point information to the target region image to obtain the integrated image.

15. The image information processing apparatus of claim 10, wherein before extracting facial feature point information on the face image, the processor is further configured to perform:

determining whether the facial feature point information on the face image meets a preset condition; and performing extracting facial feature point information on the face image in response to determining that the facial feature point information on the face image meets the preset condition; or generating failure prompt information in response to determining that the facial feature point information on the face image does not meet the preset condition.

16. The image information processing apparatus of claim 10, wherein extracting facial feature point information from the target image information and integrating the facial feature point information to the target region image to obtain the integrated image comprises:

transmitting the target image information to a server to obtain target character string information fed back by the server after face fusion processing is performed according to the target image information; and parsing the target character string information to obtain the integrated image after the face fusion processing.

17. The image information processing apparatus of claim 16, wherein parsing the target character string information to obtain the integrated image after the face fusion processing comprises:

parsing the target character string information, to generate a preset quantity of integrated image addresses and shared image addresses;

loading a preset quantity of integrated images and shared images according to the preset quantity of integrated image addresses and shared image addresses; and starting the video.

18. The image information processing apparatus of claim 10, wherein displaying the integrated image on the video in response to detecting that the video is played to the preset playback interval comprises:

overlaying the integrated image on the set display component in response to detecting that the video is played to a starting point position of the preset playback interval, to obtain a target component, and overlaying and displaying the target component on the video; and removing the target component overlaid and displayed on the video in response to detecting that the video is played to an ending point position of the preset playback interval.

19. A non-transitory computer-readable storage medium storing computer program instructions executable by at least one processor to perform:

obtaining a candidate image;

compressing a size of the candidate image to obtain a compressed image;

generating a display component and drawing the compressed image on the display component;

encoding the drawn display component to generate the target image information;

extracting facial feature point information from the target image information, and integrating the facial feature point information to a target region image to obtain an integrated image, the target region image being part of a playback image in a preset playback interval of a video; and displaying the integrated image on the video in response to detecting that the video is played to the preset playback interval.

* * * * *